United States Patent [19]

Dougherty

[11] Patent Number: 5,494,358
[45] Date of Patent: Feb. 27, 1996

[54] PACKAGE BEARING

[75] Inventor: John D. Dougherty, North Canton, Ohio

[73] Assignee: The Timken Company, Canton, Ohio

[21] Appl. No.: 193,708

[22] Filed: Feb. 9, 1994

[51] Int. Cl.$^6$ ............................ F16C 32/00; F16C 33/46; F16C 33/58; F16C 43/04
[52] U.S. Cl. ..................... 384/448; 384/561; 384/564; 384/571; 384/577
[58] Field of Search ..................... 384/448, 577, 384/572, 573, 575, 576, 580, 571, 559, 561, 564

[56] References Cited

U.S. PATENT DOCUMENTS

| | | | |
|---|---|---|---|
| 1,200,445 | 10/1916 | Laycock | 384/561 |
| 1,397,142 | 11/1921 | Palmgren | 384/571 |
| 1,494,712 | 5/1924. | Scheffler | 384/575 |
| 1,911,336 | 5/1933 | Ackerman | 384/571 X |
| 1,949,824 | 3/1934 | Buckwalter | 384/571 |
| 1,967,822 | 7/1934 | Horger | 105/79 |
| 3,420,589 | 1/1969 | Green | 384/620 |
| 3,583,511 | 6/1971 | Asberg | 384/544 X |
| 3,589,747 | 6/1971 | Asberg | 280/96.1 |
| 3,936,105 | 2/1976 | Asberg | 384/482 |
| 4,217,007 | 8/1980 | Filippa | 384/484 X |
| 4,333,695 | 6/1982 | Evans | 384/562 |
| 4,647,230 | 3/1987 | Friedrich | 384/510 |
| 5,022,659 | 6/1991 | Otto | 277/1 |
| 5,037,214 | 8/1991 | Dougherty | 384/571 |
| 5,039,231 | 8/1991 | Kispert et al. | 384/577 X |
| 5,085,519 | 2/1992 | Dougherty | 384/448 |
| 5,129,743 | 7/1992 | Faye et al. | 384/448 |
| 5,209,580 | 5/1993 | Nakayama | 384/448 |

FOREIGN PATENT DOCUMENTS 0286151  10/1988  European Pat. Off. ............... 384/486

*Primary Examiner*—Thomas R. Hannon
*Attorney, Agent, or Firm*—Polster, Lieder, Woodruff & Lucchesi

[57] ABSTRACT

A package bearing includes a nonrotatable outer bearing ring having flanges along which it is attached to the suspension system of a vehicle, a rotatable inner bearing ring located within the outer ring and having a flange to which a road wheel is attached, and tapered rollers arranged in two rows between the outer and inner rings. The large ends of rollers on the outboard row bear against a rib at the flange on the inner ring, while the large ends of the rollers of the inboard row bear against a rib ring that is formed as a separate element and is subsequently connected to one of the rings. Between its inboard and outboard raceways the inner ring has a cylindrical intervening surface, the diameter of which exceeds the largest diameter on the inboard raceway of the inner ring. This enables an encoder ring to advance over the inboard raceway, and to be pressed over the intervening surface to its final position. Thereafter, the rollers of the inboard row are likewise advanced over the large end of the inboard raceway for the inner ring, all while confined in a cage—but the cage has breaks in its small end ring to enable it to expand and accommodate the large end of the raceway. Then the separate rib ring is secured against one of the rings at the large end of the inboard raceway for that ring. The outer ring carries a sensor which monitors the encoder ring, producing an electrical signal which reflects the angular velocity of the encoder ring.

13 Claims, 6 Drawing Sheets

PACKAGE BEARING

BACKGROUND OF THE INVENTION

This invention relates in general to antifriction bearings and more particularly to an easily assembled package bearing.

The road wheels of automotive vehicles rotate on antifriction bearings that accommodate both axial and radial loads. Typically two single row bearings exist at each wheel and they are organized in opposition so that one takes thrust loads in one direction and the other takes thrust loads in the opposite direction. To this end, each of the two bearings has rolling elements which roll along raceways that are inclined relative to the axis of rotation. The raceways for the one row are inclined opposite to the raceways in the opposite row, this giving the bearings the capacity to take thrust loads in both axial directions.

But the individual components that actually serve to couple the road wheel to the vehicular suspension system must be assembled, and this requires time. Moreover, the assembly procedure usually requires applying grease to serve as a lubricant, fitting seals to retain the grease and protect the bearings from contaminants. Moreover, the bearings usually require adjustment so that they operate at the proper setting— either end play or preload—and this requires skill. If the components also include sensing devices for antilock braking systems, the assembly procedure becomes more complex and time-consuming.

In an effort to simplify assembly operations, automobile and truck manufacturers have turned to package bearings for at least some of the road wheels, both driven and nondriven, of their vehicles. The typical package bearing has two rings which rotate relative to each other by reason of rolling elements interposed between them in two rows. One of the rings fits to the suspension system of the vehicle to which it is secured with bolts, while the other has the road wheel attached to it with nuts turned down over threaded studs. Thus, the whole assembly procedure essentially reduces to bolting components together.

The assembly problems which the automotive manufacturers avoid, bearing manufacturers assume, but with less intensity. Certainly, assembling a package bearing on an assembly line dedicated to such bearings is a good deal easier than undertaking the assembly as part of the overall assembly procedure for the automobile. Moreover, the critical adjustment occurs in an environment which lends itself to considerably more control and precision. But still many packaged bearings or bearing assemblies of current manufacture contain numerous parts and are in their own right difficult to assemble and adjust.

Apart from that, antilock brake systems rely on sensors at the individual wheels and these sensors monitor encoder rings which rotate with the wheels. Often the sensors and encoder rings are exposed and thus more likely to be damaged by rocks, water and road chemicals.

The present invention resides in a packaged bearing assembly that is easily assembled and subsequently installed on an automotive chassis. It also resides in a bearing that has the capacity to monitor angular velocity and includes an encoder ring which is located within the bearing, and is passed over one of the raceways during the assembly of the bearing. To further facilitate assembly one of the rows of rollers is confined by a cage which has breaks in one of its end rings, and these breaks enable the cage to expand as the rollers and cage pass over the large end of the raceway along which the rollers operate. The bearing also has a nonintegral rib ring along one of its raceways, and this ring forms a sealing surface. The invention further resides in the process for assembling the package bearing. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur.

DETAILED DESCRIPTION

Figure 1:
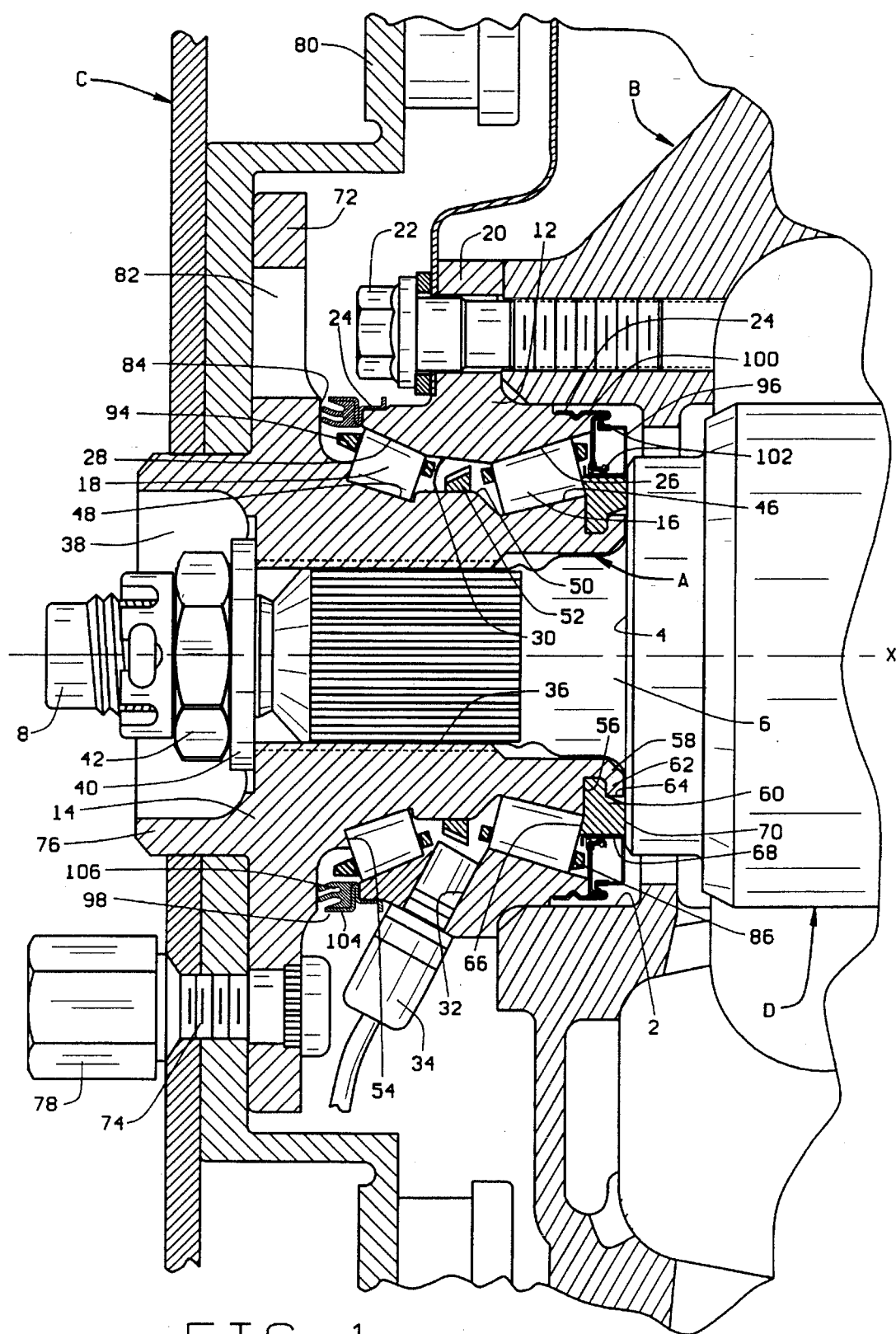
FIG. 1 is a sectional view of a package bearing constructed in accordance with and embodying the present invention, the bearing being illustrated attached to a vehicular suspension system.

Referring now to the drawings, a package wheel bearing A (FIG. 1) is attached to a component B forming part of the suspension system of an automotive vehicle, all to provide a mounting for a road wheel C which rotates relative to the suspension system component B about an axis X. The wheel bearing A also has the capacity to generate an electrical signal which reflects the angular velocity of the wheel C. The road wheel C may be driven or nondriven, and in the case of the former, it is coupled to a drive shaft D through the package bearing A. The suspension system component B, which may be a strut, has a circular opening 2 which receives the bearing A, and the drive shaft D as well. Here the drive shaft D is reduced in diameter to provide a shoulder 4 and a spindle 6 projected beyond the shoulder 4. The spindle 6, which carries a spline, extends through the bearing A and terminates at a threaded end 8 located beyond the bearing A. The bearing A comprises three basic components, namely an outer bearing ring 12 which is attached to the suspension system component B, an inner bearing ring 14 with which the drive shaft D is engaged and to which the wheel C is attached, and rolling elements in the form of tapered rollers 16 and 18 arranged in two rows between the bearing rings 12 and 14, the rollers 16 being in the inboard row and the rollers 18 in the outboard row. The rollers 16 and 18 enable the inner ring 14 to rotate within the outer ring about the axis X and further transfer both radial and axial loads between the rings 14 and 16.

Turning now to the outer bearing ring 12 (FIG. 1), it fits partially into the circular opening 2 of the suspension system component B, but has three flanges 20 which project outwardly and lie along the face of the component B to position the outer ring 12 on the component B. Indeed, the outer ring 12 is fastened securely to the component B with bolts 22 which pass through the flanges 20 and thread into the component B. Thus, the outer ring 12, while being received in the opening 2, projects out of the opening 2 and beyond the component B. At both of its ends, the ring 12, on its exterior surface is machined down to provide cylindrical seal surfaces or seats 24. The outer ring 12 also has two raceways 26 and 28 and an intervening surface 30 between the raceways 26 and 28, but in contrast to the seal seats 24, these surfaces are presented inwardly toward the axis X of rotation. The raceways 26 and 28 taper downwardly from the inboard and outboard ends, respectively, of the outer ring 12 and merge into the intervening surface 30 at their small diameter ends. Between two of its flanges 20, the outer ring 12 has a bore 32 which is oriented obliquely to the axis X and at its inner end opens into the interior of the ring 12 through the intervening surface 30. The bore 32 contains a probe-type speed sensor 34.

The outer ring 12 is formed from a medium carbon steel as a forging, the steel being of a high quality suitable for use in bearings. The forging is then machined to provide the raceways 26 and 28, the seal seats 24, the bore 32 and other surfaces, such as along its ends and along the end faces of the flanges 20. Once machined, the ring 12 is induction hardened only along the tapered raceways 26 and 28.

The inner ring 14 lies partially within the outer ring 12, its axis being coincident to the axis X of rotation. The ring 14 has a center bore 36 which opens out of the inboard end of the ring 14, but the bore 36 at its other end opens into a counterbore 38 which in turn opens out of the outboard end of the ring 14, there being a shoulder at the juncture of the bore 36 and the counterbore 38. The spindle 6 at the end of the drive shaft D extends through the center bore 36 with the shoulder 4 from which it projects being at the inboard end of the ring 14. The threaded end 8 on the spindle 6 projects into the counterbore 38 where it is fitted with a washer 40 and engaged with a nut 42 which is turned down to clamp the inner ring 14 tightly between the shoulder 4 and the washer 40. The surface of the center bore 36 carries a spline which is engaged by the spline on the spindle 6, so that the inner ring 14 rotates with the drive shaft D.

Within the confines of the outer ring 12, the inner ring 14 has inboard and outboard raceways 46 and 48 which are presented outwardly toward the inboard and outboard raceways 26 and 28, respectively, of the outer ring 12. Like the raceways 26 and 28, the raceways 46 and 48 taper downwardly toward the region between them, this region being occupied by a cylindrical intervening surface 50, the diameter of which exceeds the diameter of the small ends of the two raceways 46 and 48. Thus, the intervening surface 50 of the inner ring 14 rises out of and is elevated with respect to the adjacent ends of the raceways 46 and 48. The diameter of the intervening surface also exceeds the greatest diameter of the inboard raceway 46, that diameter existing at the inboard end of the ring 14.

The inner ring 14 at the intervening surface 50 carries an encoder ring 52 having a beveled exterior formed by a succession of notches arranged at equal circumferential intervals around the ring 52. Those notches lie directly opposite the inner end of the sensor 34, and as they pass by the end of the sensor 34 with the rotation of the inner ring 14, they activate the sensor 34, causing it to produce an electrical signal having a frequency which reflects the angular velocity. An interference fit exists between the encoder ring 52 and the intervening surface 50 of the inner ring 14, the ring 52 having been driven to its proper position on the surface 50 by exerting an axially directed force of sufficient magnitude to overcome the interference fit. Owing to the oblique orientation of the sensor 34 and the bevel of the exterior surface on the encoder ring 52, the axial position that the encoder ring 52 assumes is of some importance, because its position controls the size of the gap between the end of the sensor 34 and the encoder ring 52, and the gap must be set with some precision for the sensor 34 to operate most effectively. U.S. Pat. No. 5,085,519 granted Feb. 4, 1992, for an invention of J. Dougherty discusses the procedure for establishing the proper gap between the beveled encoder ring 52 and the sensor 34.

The outboard raceway 48 extends axially away from the raised intervening surface 50 and ends at a rib 54 which rises from the large end of the raceway 48 nearly perpendicular to the raceway 48, it forming a working surface at the large end of the raceway 48. The inboard raceway 46, on the other hand, ends at an abutment surface 56 which lies perpendicular to the axis X. Indeed, the abutment surface 56 serves as a shoulder at the end of a smaller ring extention 58 which extends out to the very end of the inner ring 14.

Initially the ring extension 58 has a truly cylindrical outer surface and otherwise exists at a uniform diameter. This configuration enables a rib ring 60 to pass over it. After the rib ring 60 is fitted over the extension 58 and brought against the abutment surface 56, the portion of the extension 58 which lies beyond the rib ring 60 is turned radially away from the axis X by a swaging or orbital forging or some other suitable metal working operation to create a radial lip 62 which holds the rib ring 60 fast against the abutment surface 56. To this end the rib ring 60 has a rabbet 64 which lies along the ring extension 58. The metal working operation turns the end of the ring extention 58 outwardly into the rabbet 64 of the rib ring 60, thus capturing the rib ring 60 between the abutment surface 56 and the lip 62 formed on the end of the extension 58. The rib ring 60 projects beyond the large end of the tapered inboard raceway 46 where it is provided with a rib face or working surface 66 that lies nearly perpendicular to the raceway 46. The rib ring 60 also has a cylindrical seal surface or seat 68 which is presented outwardly away from the axis X and a back face 70 which is squared off with respect to the axis X and forms the endmost extension of the bearing A. In driven applications, the back face 70 bears against the shoulder 4 from which the spindle 6 projects on the drive shaft D, and the clamping force exerted by the nut 42 further serves to clamp the rib ring 60 between the abutment surface 56 on the inner ring 14 and the shoulder 4 on the drive shaft D. In nondriven applications the drive shaft D is omitted, and the rib ring 60 is retained solely by the lip 62.

The rib ring 60 may be formed from wrought bearing steel which is case hardened or induction hardened, at least along its working surface 66. It may also be formed from powdered metal which is hardened along the working surface 66.

Beyond the rib 54 at the large end of the outboard raceway 48, the inner ring 14 flares outwardly past the outboard end of the outer ring 12 in the form of a flange 72 which carries threaded studs 74. The inner ring 14 also projects axially beyond the flange 72 in the form of a cylindrical boss 76 which contains the counterbore 38. The road wheel C fits around the boss 76 and is secured to the flange 72 by nuts 78 which thread over the studs 74. The nuts 78 and studs 74 also serve to clamp a brake disk 80 against the flange 72 of the inner ring 14.

Even though the periphery of the flange 72 on the inner ring 14 lies beyond the flanges 20 on the outer ring 12, the bolts 22 which extend through the flanges 20 of the outer ring 12 and attach that ring to the suspension system component B are accessible, because the larger flange 72 contains apertures 82 through which the heads of the bolts 22 are exposed. Immediately inwardly from the apertures 82 and directly opposite the large end of the outboard raceway 28 on the outer ring 12, the flange 72 of the inner ring 14 has a radially directed sealing surface 84 which is machined to provide a smooth surface along which a fluid barrier may be established.

The inner ring 14, like the outer ring 12, is formed from a medium carbon bearing steel as a forging which is subsequently machined on many of its surfaces, including the raceways 46 and 48 and the intervening surface 50 as well as the sealing surface 84. Moreover, the steel is hardened along the raceways 46 and 48 and along the face of the rib 54 by induction hardening techniques.

The tapered rollers 16 lie in a single row between the inboard raceways 26 and 46 of the outer and inner rings 12 and 14, respectively, with their large diameter ends against the working surface 66 of the rib ring 60. The rollers 16 are on apex, meaning that if their tapered side faces are extended to their respective apexes, those apexes would lie at a common point along the axis X of rotation. Of course, the raceways 26 and 46, if likewise extended to their apexes, would have those apexes at essentially the same point. By reason of the tapered geometry of the rollers 16 and raceways 26 and 46, radial loads transmitted through the rollers 16 resolve into small axial components which urge the rollers 16 up the raceways 26 and 46. The rib ring 60 prevents the rollers 16 from being expelled from the annular space between the raceways 26 and 46.

To maintain uniform spacing between the rollers 16 of the inboard row, those rollers 16 are fitted with a cage 86 having end rings 88 which extend circumferentially past the large and small ends of the rollers 16 and bridges 90 which extend axially between the end rings 88 and fit between the rollers 16 to serve as spacers which actually separate the rollers 16. The cage 86 is preferably molded from a tough, yet somewhat resilient polymer, such as nylon 6,6, which is a glass-reinforced nylon containing an elastomer to impart resiliency, and is of the above centerline type, meaning that its bridges 90 extend between the rollers 16 beyond the axial centerlines of the rollers 16. But the cage 86 differs from traditional plastic cages in that its small end ring 88 contains breaks 92 (FIG. 4) between some of its bridges 90, preferably at the end of every third roller 16. The breaks 92 permit the cage 86 to expand at its small end, with the expansion, while remaining within the elastic limits of the polymer, being sufficient to permit the rollers 16 and the cage 86 to pass over the large end of the inboard raceway 46 on the inner ring 14, of course, in the absense of the rib ring 60. In short, the breaks 92 facilitate installation of the cage 86 and rollers 16 as a unit around the inboard raceway 46 of the inner ring 14.

The tapered rollers 18 lie in a single row between the outboard raceways 28 and 48 of the outer and inner rings 12 and 14, respectively, and may be smaller than the rollers 16 of the inboard row. They too are on apex, as are the raceways 28 and 48. The outboard rollers 18 carry a cage 94 which serves to maintain reasonably uniform spacing between the rollers 18, and the cage 94 is preferably molded from a suitable polymer in the above centerline configuration, so that its bridges 90 lie beyond the axial centerlines of the rollers 18. The cage 94 is large enough and elastic enough to enable it, while the rollers 18 are within it, to move axially over the large end of the inboard raceway 46 and the intervening surface 50 of the inner ring 14.

Preferably, the tapered rollers 16 and 18 are formed from case-hardened bearing steel. While depicted in different sizes, the rollers 16 and 18 of the two rows may be identical.

The bearing A also has seals 96 and 98 which close its inboard and outboard ends, respectively. The inboard seal 96 includes two metal cases 100, one of which fits over the inboard seal seat 24 of the outer ring 12 and the other over the seal seat 68 on the rib ring 60, and also elastomeric seal elements 102 which are bonded to the cases 100. The seal element 102 on the outer case 100 bears against the inner case 100, establishing a dynamic fluid barrier along it, while the seal element 102 on the inner case 100 bears against the outer case 100, establishing another dynamic barrier along it. The inboard seal 96 embodies the dual element and case concept disclosed in U.S. Pat. No. 5,022,659 issued Jun. 11, 1991 for an invention of D. Otto. However, other seal concepts may also be used—indeed, a less sophisticated seal having a case fitted to the seal seat 24 on the outer ring and an elastomeric seal element that bears against the seal seat 68 on the rib ring 60 will suffice.

The outboard seal 98 has a metal case 104 which fits over the outboard seal seat 24 on the outer ring and a seal element 106 bonded to it. The seal element 106, which is large enough to pass over the rollers 18 of the outboard row, bears against the sealing surface 84 on the flange 72 of the inner ring 14, establishing a dynamic fluid barrier along the surface 84.

Figure 2:
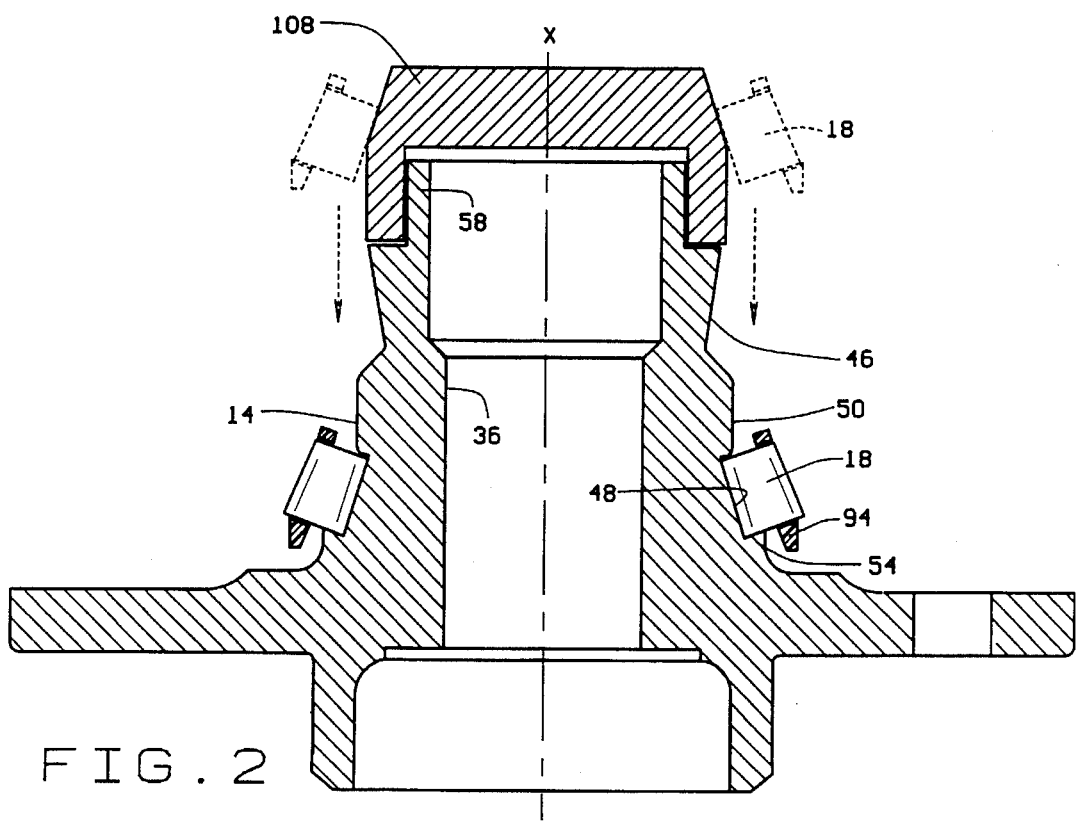
FIG. 2 is a sectional view showing the inner bearing ring during the installation of the outboard row of rollers.

To assemble the bearing A, the assembler first places the inner ring 14 on a supporting surface with its boss 76 presented downwardly and its inboard raceway 46 opening upwardly (FIG. 2). At this juncture the ring extension 58 remains truly of one diameter and the rib ring 60 is detached. The assembler thereupon places the rollers 18 of the outboard row around a mandrel 108 along with the cage 94 for that row. The cage 94, being the above centerline type, prevents the rollers 18 from falling away from the mandrel 108. With the rollers 18 and cage 94 located around the mandrel 108, the assembler aligns the mandrel 108 with the inboard raceway 46 on the inner ring 14 and moves the rollers 18 and cage 94 as a unit off the mandrel 108 and onto the inboard raceway 46, and from there over the intervening surface 50 and onto the outboard raceway 48 where the rollers 18 come to rest with the large ends against the rib 54.

Once the outboard rollers 18 and cage 94 are around the raceway 48, the assembler passes the encoder ring 52 over the inboard raceway 46, with its beveled surface presented toward the rollers 18 that are already in place, and aligns the ring 52 with the intervening surface 50. The assembler applies enough force to the ring 12 to drive it over the intervening surface 50, but not to its final position.

Figure 3:
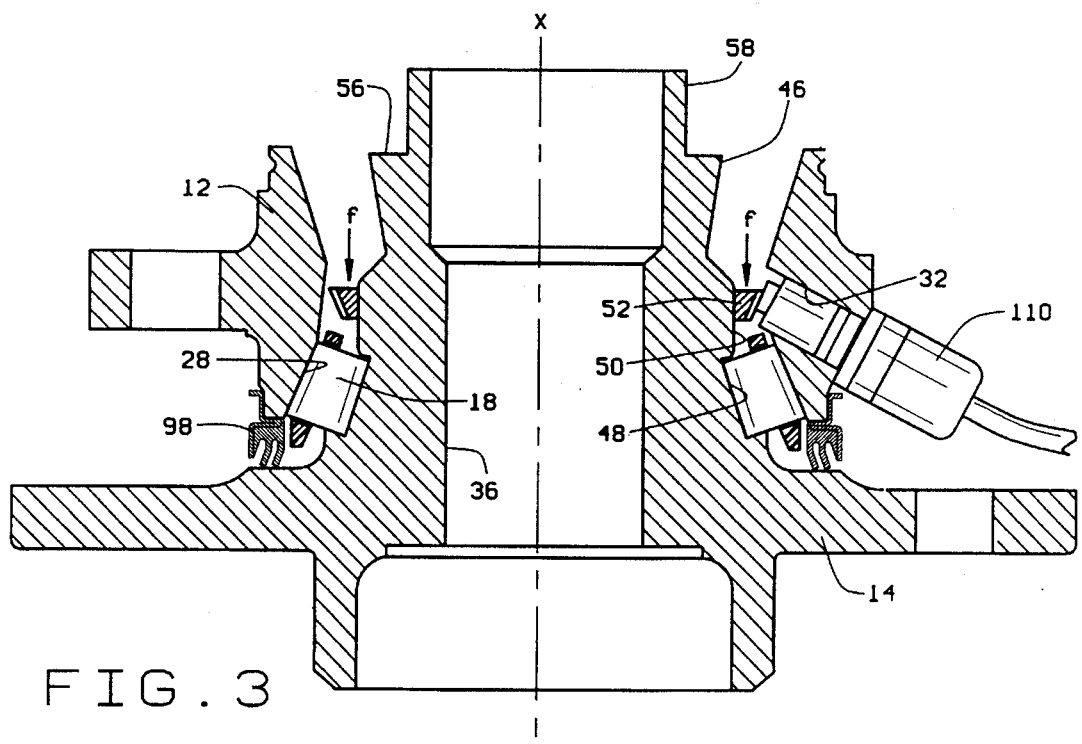
FIG. 3 is a sectional view showing the inner and outer rings during the installation and adjustment of the encoder ring.

Next the assembler forces the case 104 of the outboard seal 98 over the outboard seal seat 24 on the outer ring 12 and then lowers the outer ring 12 over the inner ring 14 (FIG. 3). Its outboard raceway 28 seats against the rollers 18 of the outer row as the seal element 106 of the outboard seal 98 comes against the sealing surface 84 on the flange 72 of the inner ring 14. Thus, the inner ring 14 supports the outer ring 12 with the inboard ends of the two rings 12 and 14 presented upwardly.

Now a gage 110 is installed in the oblique bore 32 of the outer ring 12 to ascertain the distance between the beveled surface of the encoder ring 52 and a reference point along the bore 32 (FIG. 3). With the gage 110 in place, the assembler applies sufficient force f to the encoder ring 52 to overcome the interference fit and advance the ring 52 along the intervening surface 50. The force f remains and the ring 52 advances until the gage 110 registers a predetermined distance— one that will enable a proper gap to exist between the ring 52 and the sensor 34 when the latter is inserted into the bore 32. U.S. Pat. No. 5,085,519 considers the installation of the encoder ring 52 and the sensor 34 as well in more detail.

Figure 4:
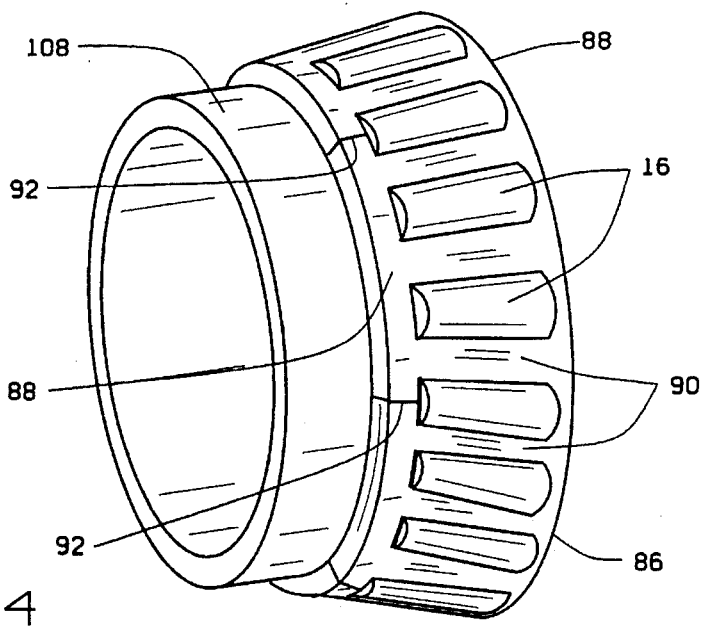
FIG. 4 is a perspective view showing the rollers of the inboard row together with the cage which contains those rollers, all located over the mandrel used to install the inboard rollers over the inner race.
Figure 5:
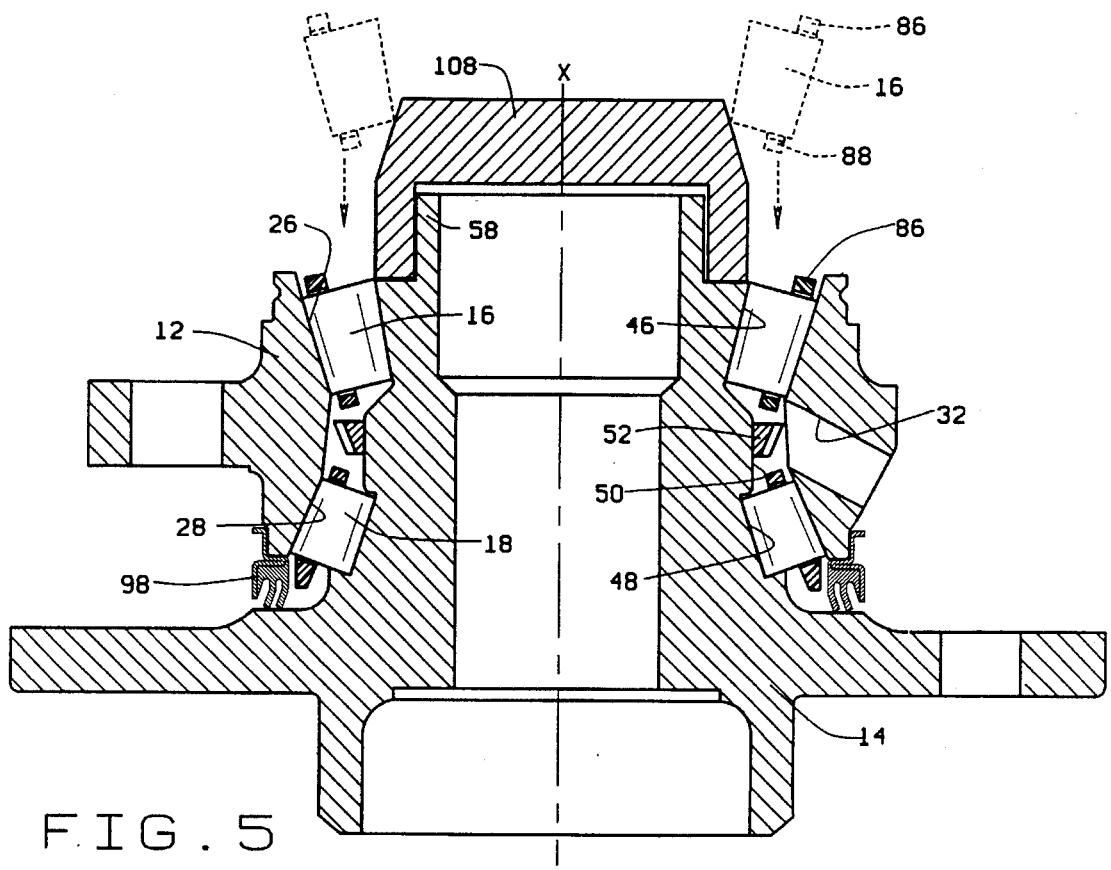
FIG. 5 is a sectional view showing the inner and outer rings during the installation of inboard row of rollers.

Using the same mandrel 108 the assembler now arranges the rollers 16 for the inboard row on a single row around the mandrel 108, holding them in place with the cage 86 (FIG. 4). The assembler again aligns the mandrel 108 with the large end of the inboard raceway 46 on the inner ring 14 and advances the rollers 16 and cage 86 into the annular space between the tapered inboard raceways 26 and 46 (FIG. 5). As the small ends of the rollers 16 move over the mandrel 108 and pass onto the large end of raceway 46 on the inner ring 14, they tip outwardly and assume a position somewhat farther from the axis X than that in which they are designed to operate. The cage 86 accommodates the displacement, for its small end ring 88 simply spreads at the breaks 92 in it, allowing the bridges 90 to move radially outwardly while still holding the rollers 16 around the mandrel 108 and raceway 46. As the rollers 16 move down the two raceways 26 and 46, the cage 86 at its small end ring 88 closes and assumes its normal configuration in which the breaks 92 are completely closed, for after all, the cage 86 never yields beyond the elastic limit of the polymer from which it is molded. The rollers 16, when fully seated between the raceways 26 and 46, should have their large end faces near, yet offset slightly downwardly from the abutment surface 56 at the inboard end of the inner ring 14 (FIG. 5).

Figure 6:
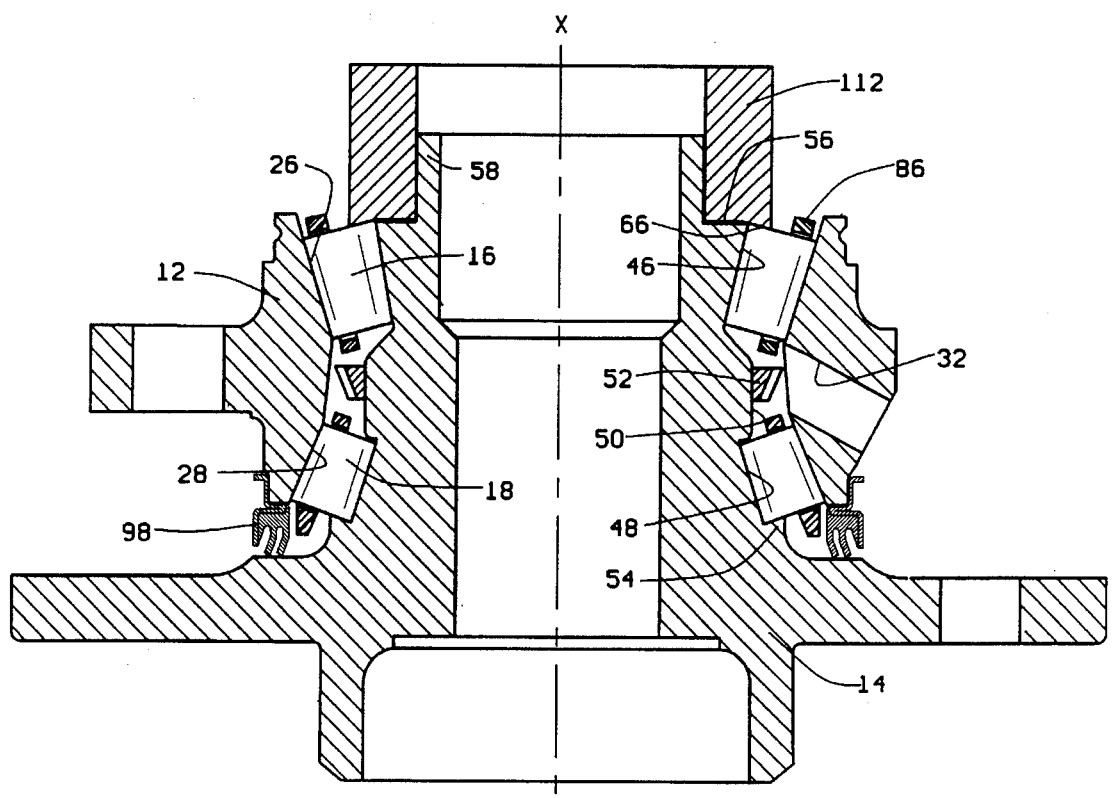
FIG. 6 is a sectional view of the bearing as it undergoes adjustment to acquire the proper setting.

At this juncture, the assembler adjusts the bearing to provide it with the proper setting. To this end a master rib ring 112 is placed over the ring extension 58 of the inner ring and clamped firmly against the abutment surface 56 (FIG. 6). Like the rib ring 60, the master ring 112 has a working surface 66 that is located opposite the large diameter ends of the rollers 16 for the inboard row. With the master rib ring 112 clamped firmly against the abutment face 56 of the inner ring 14, one of the rings 12 or 14 is rotated relative to the other ring while a light axially directed force is imposed on the rings to seat the rollers 18 of the outboard row against the outboard raceways 28 and 48 and against the rib 54. The axial position of the outer ring 12 is recorded. With the rotation continuing, the axial force is reversed so that it now seats the rollers 16 of the inboard row against the inboard raceways 26 and 46 and against the working surface 66 of the master rib ring 112. The new axial position of the outer ring 12 is recorded. The difference between the two axial positions represents the end play in the bearing A when it operates with the master rib ring 112—and the master rib ring 112 is configured to place all bearings A in end play, that is to say, in a condition in which some axial and radial free motion exists between the outer and inner rings 12 and 14.

The end play may be altered or even removed entirely by adjusting the axial position of rollers 16 along the inboard raceways 26 and 46. For example, if the rollers 16 are displaced further down the raceways 26 or 46, the bearing A will have less end play, yet the rollers 26 and 46 will remain essentially on apex. A mathematical relationship exists between the change in end play and the change in the axial displacement of the rollers 26 and 46—a relationship well known to bearing designers—and by using this relationship one may determine how much the rollers 16 must be displaced to reduce the end play to a desired value, or remove it altogether, or to even place the bearing A in a condition of preload.

Since the working surface 66 of the rib ring 60 determines the axial position of the rollers 16 along the inboard raceways 26 and 46, the actual rib ring 60 may be turned or ground so that its working surface 66 will be offset downwardly from the position assumed by the working surface 66 of the master ring 112. The offset selected should provide the bearing A with the correct setting, whether it be end play or preload. Thus, once the end play with the master rib ring 112 is measured, the master rib ring 112 is removed and an actual rib ring 60 is selected with its wear surface displaced from the working surface 66 of the master ring 112 by an amount calculated to give the bearing A the proper setting. To this end, the assembler may have at his disposal a collection of rib rings 60 with known offsets for their working surfaces 66— that is offsets from the working surface 66 of the master ring 112—and the assembler simply selects one with the proper offset. On the other hand, the assembler may machine the actual rib ring 60 to acquire the proper offset.

In any event, once the assembler acquires a rib ring 60 with the proper offset for its working surface 66, the assembler installs that rib ring 60 over the ring extension 58 and then turns the end of the ring extension 58 outwardly into the rabbet 64 of the rib ring 60 to form the lip 62. To do so, the assembler may rely on swaging or so called orbital forging or for that matter any other metal working procedure designed to achieve that end. The lip 62, being turned outwardly into the rabbet 64 of the rib ring 60, captures the rib ring 60 and holds it against the abutment surface 56 at the end of the inner ring 14.

Finally, the assembler installs the speed sensor 34 and the inboard seal 96. The sensor 34 is simply forced into the oblique bore 32 in the outer ring 12 until it bottoms out against the surface at the outer end of the bore 32. The seal 96 is installed by forcing its metal outer case 100 over the seal seat 24 at the inboard end of the outer ring 12 and its metal inner case 100 over the seal seat 68 on the rib ring 60.

This completes the assembly of the bearing A. Being a package, the bearing A is delivered as a unit to an automobile manufacturer or repair facility. To install it on an automotive vehicle, its inner ring 14 is fitted over the spindle 6 of the drive shaft D, if one exists, while the outer ring 12 is maneuvered into the circular opening 2 of the suspension system component B until the flanges 20 come against the component B, whereupon the bolts 22 are inserted through the flanges 20 and threaded into the component B. To this end, the assembler rotates the inner ring 14 until the apertures 82 in its flange 72 align with and expose the flanges 20 on the outer ring 12. The assembler inserts the bolts 22 through the apertures 82 and the wrench which drives them as well and rotates the bolts 22 until their heads seat firmly against the flanges 20. Finally, the assembler installs the brake disk 80 over the threaded studs 74 that project from the flange 72 and the wheel C as well, and secures both with the nuts 78 which are engaged with the threaded studs 74 and turned down over them. The outer ring 12 may be attached to the suspension system component B with its speed sensor 34 located downwardly as shown or upwardly. Moreover, a heat shield may be fastened to the outer ring 12 to shield the sensor 34 from the brake disk 80.

In lieu of the encoder ring 52 existing as a separate component, it may take the form of notches forged directly into the inner ring 14 at the intervening surface 50. Moreover, the sensor 34 may be oriented with its axis perpendicular to the axis X.

Figure 7:
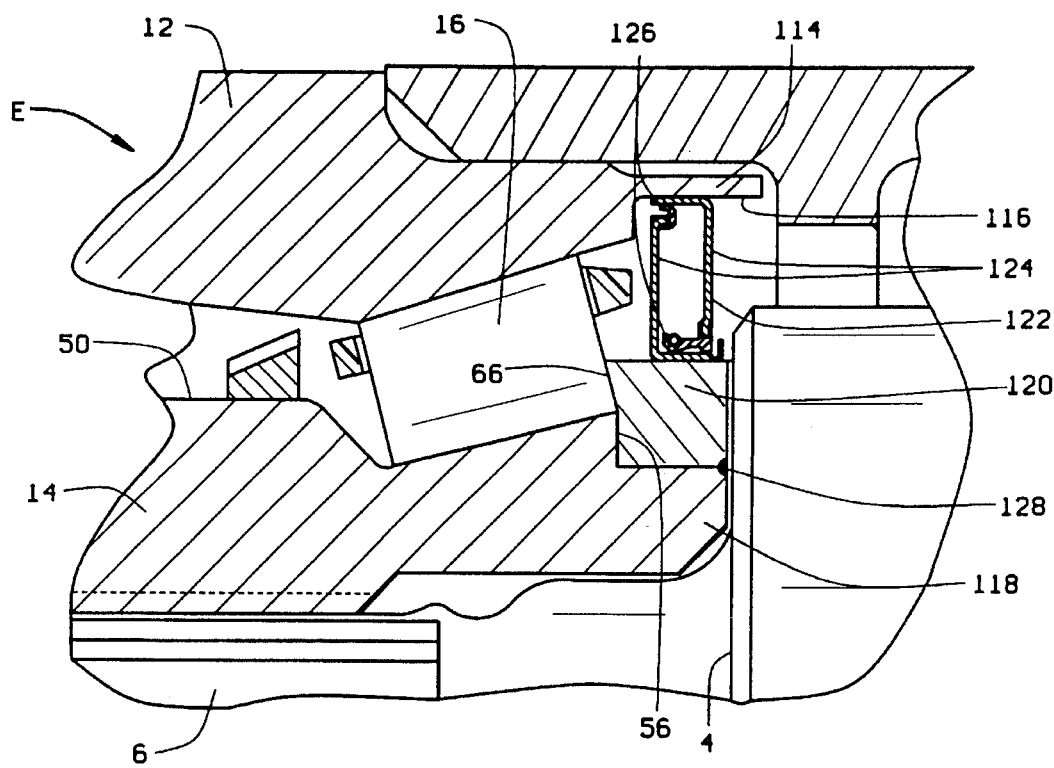
FIG. 7 is a fragmentary sectional view of a modified bearing.

A modified bearing E (FIG. 7) is virtually the same as the bearing A except at the inboard end of the outer and inner rings 12 and 14. The outer ring 12 has an extension 114 which contains a bore 116. The inner ring 14, on the other hand, has an extension 118, which in contrast to the extension 58 of the bearing A, does not undergo any deformation during the assembly process. The extension 118 has external threads which are engaged by threads on an internally threaded rib ring 120. Indeed, the rib ring 120 is turned down against the abutment surface 56 from which the extension 114 projects, and presents a working surface 66 at the large end of the inboard raceway 46 on the inner ring 14 as well as a cylindrical seal seat 68 within the bore 116. That bore receives a seal 122 having an outer case 124 which is pressed into the bore 116 and an inner case 124 which is pressed over the cylindrical seal seat 68 of the rib ring 120, as well as elastomeric seal elements 126 which are bonded to the cases 124 and establish dynamic fluid barriers along them. The seal 122 may be similar to the one disclosed in U.S. Pat. No. 5,022,659. The threaded rib ring 120 is secured against rotation by a weld 128 or by staking.

Figure 8:
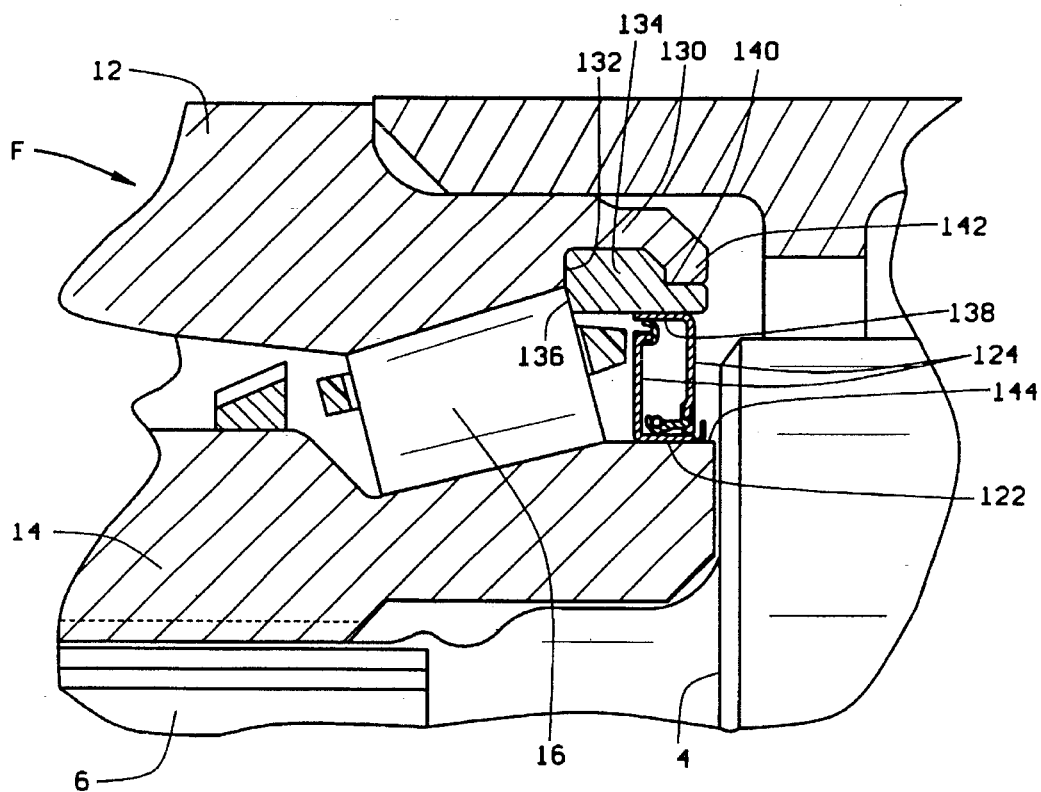
FIG. 8 is a fragmentary sectional view of another modified bearing.

In another modified bearing F (FIG. 8), the outer ring 12 has an extension 130 which projects from an abutment surface 132 and is initially purely cylindrical, thus enabling it to receive a rib ring 134 which lies against the abutment surface 132 and presents a working surface 136 at the large end of the inboard raceway 26 and a cylindrical seal seat 138 leading away from the working surface 136. While one end of the rib ring 134 lies against the abutment surface 132, the opposite end has a rabbet 140 which opens outwardly toward the extension 130 on the outer ring 12. During the assembly procedure, the end of the ring extension 130 is turned inwardly, by swaging or some other suitable metal working procedure, into the rabbet 140 to form a lip 142 that captures the rib ring 134 in the end of the outer ring 12. The inner ring 14 continues beyond the large end of its inboard raceway 46 where it has a cylindrical seal seat 144 that lies within and is encircled by the rib ring 134. Indeed, the cylindrical seal seat 144 on the inner ring 14 is presented toward the cylindrical seal seat 138 on the rib ring 134. The annular space between the two seal seats 138 and 144 contains the inboard seal 122, the outer case 124 being pressed into the seat 138 and its inner case 124 over the seat 144.

Figure 9:
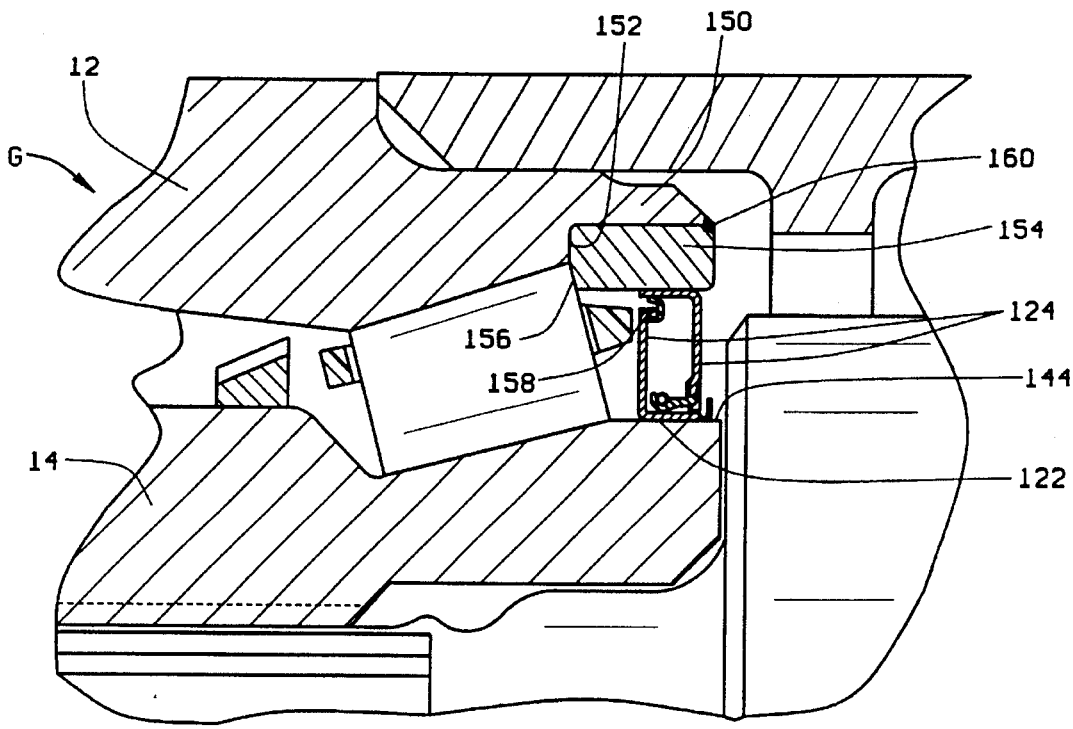
FIG. 9 is a fragmentary sectional view of still another modified bearing.

Still another modified bearing G (FIG. 9) represents a variation of the bearing F. Its outer ring 12 has a cylindrical extension 150, which in contrast to the extension 130 in the bearing F, does not undergo a deformation during the assembly procedure. It has internal threads which lead up to an abutment face 152. The threads are engaged by external threads on a rib ring 154 which threads into the extension 150 and against the abutment face 152. The rib ring 154 has a working surface 156 at the large end of the inboard raceway 26 and a cylindrical seal seat 158 which is presented toward the cylindrical seal seat 144 on the inner ring 14. The seal 122 fits between the two cylindrical seal seats 158 and 144, its outer case 124 being along the surface 158 and its inner case 124 along the surface 144. The extended rib ring 154 is secured against rotation by a weld 160 or by staking.

Figure 10:
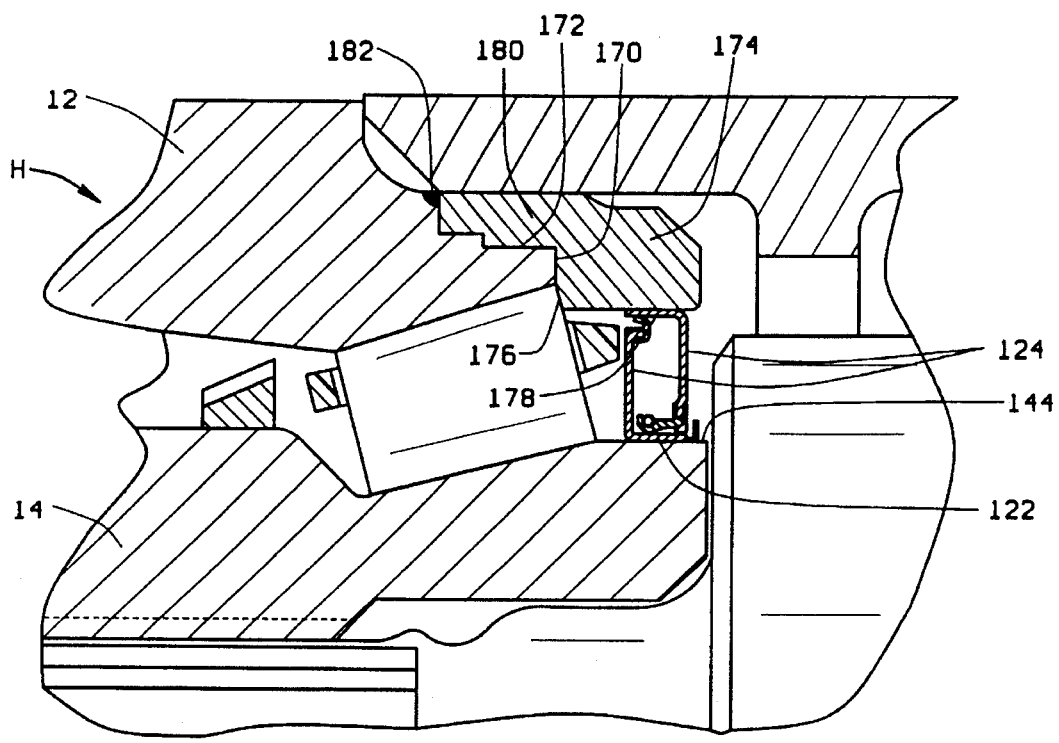
FIG. 10 is a fragmentary sectional view of yet another modified bearing.

In yet another modified bearing H (FIG. 10), the outer ring 12 at its inboard end terminates at the large end of the inboard raceway 26, it having an abutment face 170 at that end. On its outer surface the outer ring 12 has a recess 172 which is set back from the flanges 20 and extends all the way to the abutment surface 170. A portion of the exterior surface within the recess 172 is threaded. The outer ring 12 carries a rib ring 174 having a working surface 176 which is presented at the large end of the inboard raceway 26 and a cylindrical seal seat 178 that is presented inwardly toward the cylindrical seat 144 on the inner ring 14. In addition, the rib ring 174 has an axially directed extension 180 which projects into the recess 172 of the outer ring 12. Indeed, extension 180 of the rib ring 174 has internal threads which engage the threads on the outer ring 12. The rib ring 174 is turned down over the threads on the outer ring 12 until it comes against the wear abutment surface 170. The rib ring 174 is secured against rotation by a weld 182 located between it and the outer ring 12. The seal 122 fits between the seal seat 178 on the rib ring 174 and the seal seat 144 on the inner ring 14.

This invention is intended to cover all changes and modifications of the example of the invention herein chosen for purposes of the disclosure which do not constitute departures from the spirit and scope of the invention.

What is claimed is:

1. A bearing for accommodating rotation about an axis, said bearing comprising: an outer bearing ring having first and second raceways presented inwardly toward the axis of rotation; an inner bearing ring having first and second raceways presented away from the axis of rotation and toward first and second raceways, respectively, of the outer ring and an intervening surface between its first and second raceways, the intervening surface being at least as large in diameter as the greatest diameter of the first raceway on the inner ring; an encoder ring extended around the intervening surface, the encoder ring having been advanced over the first raceway of the inner ring to its position on the intervening surface; rolling elements arranged in a first row between and contacting the first raceways of the outer and inner bearing rings; more rolling elements arranged in a second row between and contacting the second raceways of the outer and inner bearing rings; and a sensor mounted on the outer bearing ring and presented toward the encoder ring for monitoring the rotation of the encoder ring, the sensor producing an electrical signal that reflects the angular velocity of the encoder ring and the inner ring to which it is fitted.

2. A bearing according to claim 1 wherein the first raceways are inclined relative to the axis such that the rolling elements of the first row transfer axial loads between the inner and outer rings in one axial direction and the second raceways are inclined such that the rolling elements of the second row transfer axial loads between the inner and outer rings in the other axial direction.

3. A bearing according to claim 2 wherein the raceways are tapered and the rolling elements are tapered rollers.

4. A bearing according to claim 3 wherein the small ends of the tapered rollers in the first and second rows are along the intervening surface of the inner ring and further comprising a rib ring formed as a separate element from the outer and inner bearing rings and secured against one of the bearing rings where it provides a working surface against which the large ends of the rollers bear.

5. A bearing according to claim 4 wherein one of the bearing rings has an abutment surface located at the large end of its first raceway and an extension directed axially beyond the abutment surface, the extension being offset radially from the large end of the first raceway; and wherein the rib ring is located along the extension and against the abutment surface, the extension being turned radially at its end remote from the abutment surface to provide a lip which captures the rib ring and prevents it from separating from the abutment surface.

6. A bearing according to claim 4 wherein the outer ring has an outwardly directed flange and the inner ring has an outwardly directed flange that lies in front of the flange on the outer ring, the flange of the inner ring having at least one aperture through which the flange of the outer ring is exposed.

7. A package bearing having the capacity to monitor angular velocity about an axis of rotation, said bearing comprising: a nonrotatable outer bearing ring having first and second tapered raceways presented inwardly toward the axis and means for securing the outer ring to a supporting structure, the first and second tapered raceways having their large ends presented at the ends of the ring; a rotatable inner bearing ring having first and second tapered raceways located within and facing the first and second raceways, respectively, of the outer ring, yet being separated from the outer ring so that an annular space exists between the outer and inner rings, and further having an intervening surface between its first and second raceways, the first raceway of the inner ring tapering in the same direction as the first raceway of the outer ring and the second raceway of the inner ring tapering in the same direction as the second raceway of the outer ring, the inner ring also having a rib which projects generally outwardly at the large end of its second raceway and a flange which projects beyond the rib past the end of the outer ring at which the second raceway of that ring exists; tapered rollers arranged in a first row between the first raceways of the outer and inner rings where they follow the taper of and contact those raceways and have their large ends against the rib; more tapered rollers arranged in a second row between the second raceways of the outer and inner rings where they follow the taper of and contact those raceways as well as contact the rib; a rib ring secured firmly against one of the bearing rings and located at the large end of the first raceway for that ring so that the large ends of the tapered rollers in the first row bear against the rib ring; an encoder ring on the intervening surface of the inner ring so that it rotates with the inner ring; a sensor fitted to the outer ring and presented toward the encoder ring on the inner ring, the sensor being activated by the encoder ring upon rotation of the encoder ring and having the capacity to produce an electrical signal which reflects the angular velocity of the inner ring; a first seal closing the annular space between the outer and inner rings at the large ends of the first raceways for those rings; and a second seal closing the annular space between outer and inner rings at the large ends of the second raceways on those rings.

8. A bearing according to claim 7 wherein the encoder ring is a component separate from the inner bearing ring; wherein the intervening surface is cylindrical; and wherein an interference fit exists between the encoder ring and the cylindrical intervening surface on the inner ring.

9. A bearing according to claim 7 wherein the diameter of the cylindrical intervening surface is at least as great as the greatest diameter of the first tapered raceway on the inner ring, and the inner ring, axially beyond the large end of its first raceway, does not in diameter exceed the diameter of the intervening surface, whereby the encoder ring may be advanced over the end of the inner ring and over the first raceway for installing it on the intervening surface.

10. A bearing according to claim 7 wherein the bearing ring to which the rib ring is secured has an extension along which the rib ring lies and the extension is turned radially and captures the rib ring on that bearing ring.

11. A bearing according to claim 7 wherein the bearing ring which does not have the rib ring secured to it has a cylindrical seal surface and the rib ring has another cylindrical seal surface; and wherein the first seal is located along and between the seal surfaces.

12. A bearing according to claim 7 wherein the second seal includes a case attached to the outer ring and an elastomeric seal element which bears against the flange on the inner ring to establish a dynamic fluid barrier along the inner ring.

13. A bearing for accommodating rotation about an axis, said bearing comprising: an outer bearing ring having first and second tapered raceways presented inwardly toward the axis of rotation; an inner bearing ring having first and second tapered raceways presented outwardly toward and located generally within the first and second raceways, respectively, of the outer ring, such that an annular space exists between the first raceways of the rings and between the second raceways of the rings; one of the bearing rings having a seal surface; tapered rollers arranged in a circular row in the annular space between the first raceways of the outer and inner bearing rings and contacting those raceways; more tapered rollers arranged in a second row in the space between the second raceways of the outer and inner rings; a rib ring formed as a separate element and secured against the other of the bearing rings where it provides a working surface against which the large ends of the tapered rollers in the first row bear as they roll along the first raceways of the outer and inner rings, the rib ring having a seal surface; a first seal located along the seal surfaces and closing the annular space between the raceways at the large ends of the first raceways; one of the bearing rings having a rib against which the large ends of the rollers in the second row bear; the inner ring further having a flange located beyond the second raceway and extending radially outwardly past that end of the outer ring at which the second raceway of that ring exists, the flange having a generally radially directed sealing surface; and a second seal extended between the outer ring and the sealing surface to close that end of the annular space that exists between the second raceways, the second seal including a generally rigid case that is fitted to the outer ring and a flexible seal element bonded to the case and bearing against the radial sealing surface on the flange of the inner ring, the seal element being large enough to pass axially over the rollers that are along the second raceways.

\* \* \* \* \*

UNITED STATES PATENT AND TRADEMARK OFFICE
CERTIFICATE OF CORRECTION

PATENT NO. : 5,494,358
DATED : Feb. 27, 1996
INVENTOR(S) : John D. Dougherty

It is certified that error appears in the above-indentified patent and that said Letters Patent is hereby corrected as shown below:

```
Claim 9,
Col. 11, line 55 - delete "7" and insert ---8---.
```

Signed and Sealed this

Nineteenth Day of November, 1996

*Attest:*

BRUCE LEHMAN

*Attesting Officer*  *Commissioner of Patents and Trademarks*